United States Patent
Tseng et al.

(10) Patent No.: US 6,309,711 B1
(45) Date of Patent: Oct. 30, 2001

(54) METHOD FOR MANUFACTURING A THREE-DIMENSIONAL OBJECT

(75) Inventors: Ampere A. Tseng; Tae-Woo Lee, both of Phoenix, AZ (US)

(73) Assignee: Arizona State University, Tempe, AZ (US)

( * ) Notice: Subject to any disclaimer, the term of this patent is extended or adjusted under 35 U.S.C. 154(b) by 0 days.

(21) Appl. No.: 09/696,869

(22) Filed: Oct. 26, 2000

Related U.S. Application Data

(62) Division of application No. 09/010,923, filed on Jan. 22, 1998, now Pat. No. 6,216,765.
(60) Provisional application No. 60/052,427, filed on Jul. 14, 1997.

(51) Int. Cl.$^7$ ........................................................ B05D 1/04
(52) U.S. Cl. ........................ 427/474; 427/189; 427/191; 427/197; 427/256; 427/422; 427/427; 427/565; 427/600
(58) Field of Search ..................... 427/474, 565, 427/600, 189, 191, 197, 256, 422, 427

(56) References Cited

U.S. PATENT DOCUMENTS

| | | |
|---|---|---|
| 5,061,454 | 10/1991 | Birk . |
| 5,207,371 | 5/1993 | Prinz et al. . |
| 5,266,098 | 11/1993 | Chun et al. . |
| 5,286,573 | 2/1994 | Prinz et al. . |
| 5,301,415 | 4/1994 | Prinz et al. . |
| 5,301,863 | 4/1994 | Prinz et al. . |
| 5,330,100 | 7/1994 | Malinowski . |
| 5,445,666 | 8/1995 | Peschka et al. . |
| 5,598,200 | 1/1997 | Gore . |
| 5,617,911 | 4/1997 | Sterett et al. . |
| 5,722,479 | 3/1998 | Oeftering . |

OTHER PUBLICATIONS

"The Aerodynamic Instability and Disintegration of Viscous Liquid Sheet," N. Dombrowski and W.R. Johns, Chemical Engineering Science, vol. 18, pp. 203–214, Pergamon Press Ltd., Oxford, Great Britain, (No date avail.).

"Rapid Prototyping & Manufacturing,: Fundamentals of Stereo Lithography," First Edition, Paul F. Jacobs, Ph.D., Principal Author, Published by Society of Manufacturing Engineers in Cooperation with the Computer and Automated Systems Association of SME, 1992, (No month avail.).

"Effects of Droplet Thermal State on Depost Microstructure in Spray Forming," Chen–An Chen, Paul Acquaviva, Jung–Hoon Chung and Teiichi Ando, Scripta Materialia, vol. 34, No. 5, pp. 689–696, 1996, Elsevier Science Ltd., (No month avail.).

"Thermal Modeling of Deposit Solidification in Uniform Droplet Spray Forming," Jung–Hoon Chun, Massachusetts Institute of Technology, Teiichi Ando, Tufts University; Abstract, (No date avail.).

*Primary Examiner*—Bernard Pianalto
(74) *Attorney, Agent, or Firm*—Baker Botts L.L.P.

(57) ABSTRACT

Improved assembly and methods for manufacturing a three-dimensional object are described. The assembly includes a crucible for holding molten metal, an orifice disposed in the bottom of the crucible through which a jet of molten metal can flow towards a movable substrate, and a mechanically oscillating member immersed in the molten metal for controlling the flow of molten metal through the orifice and for breaking the flow of molten metal into the sequence of molten metal drops. As the drops land on the movable substrate, a three-dimensional object is built up. Continuously variable diameter or controllable planar jets may be used as the orifices. In forming drops from the output of a planar jet, the jet is first broken up by the oscillating member into horizontal cylindrical ligaments and the ligaments are then broken up into drops by acoustic energy applied by audio loudspeakers adjacent the falling ligaments. The assembly and methods are useful in the fields of rapid prototyping and materials processing.

7 Claims, 5 Drawing Sheets

METHOD FOR MANUFACTURING A THREE-DIMENSIONAL OBJECT

This is a divisional of application Ser. No. 09/010,923 filed Jan. 22, 1998, U.S. Pat. No. 6,216,765 and claims benefit of Provisional Application Ser. No. 60/052,427 filed Jul. 14, 1997.

This invention was made with support from the National Science Foundation under contract numbers DMI-9696062 XAA-009. Accordingly, the U.S. government may have rights in the disclosed invention.

BACKGROUND OF INVENTION

The present invention relates to an apparatus and method for manufacturing a three-dimensional object. According to the apparatus and methods of the present invention, continuously variable diameter or controllable planar jets are used to form three-dimensional objects in an environment-controlled processing chamber. The apparatus and methods of the present invention are useful in the fields rapid prototyping and materials processing.

Manufacturing processes utilizing deposition techniques have been developed for rapid and flexible prototyping of three-dimensional parts and tooling. For example. U.S. Pat. Nos. 5,301,863, 5,301,415, 5,207,371 and 5,286,573 to Prinz et al. disclose conventional systems and methods for manufacturing three-dimensional objects by forming incremental buildup of layers on a work surface. In preferred embodiments of these inventions, thermal spray or weld deposition techniques are used to deposit object and support layers on a work surface.

Drop generators have also been developed and applied to the rapid prototyping of three-dimensional objects. See P. F. Jacobs, *Rapid Prototyping and Manufacturing*, ch. 16 (Society of Manufacturing Engineers, Dearborn, Mich. 1992). In a conventional drop generator of this type, molten metal is ejected as a uniform laminar liquid jet from a circular injector, or nozzle, located at the bottom of a heated reservoir. The uniform laminar liquid jet is broken into a series of uniform drops of desired size by selecting an injector diameter and varying the frequency of external oscillation near the injector or nozzle orifice. The uniform drops are then deposited in layers on a substrate surface where they solidify to form the desired three-dimensional metal product.

With this technique, the resulting metal products can be designed to have fine, equiaxed micro-structures without manufacturing defects such as porosity or alloy segregation. See C.-A. Chen, P. Acquaviva, J.-H. Chun and T. Ando, "Effects of Droplet Thermal Stale on Deposit Microstructure in Spray Forming", *Scrilpta Materiala*, vol. 34, pp. 689–696 (1996); J.-H. Chun and T. Ando, "Thermal Modeling of Deposit Solidification in Uniform Droplet Spray Forming," *Proceedings of the 1996 NSF Design and Manufacturing Grantees Conference*, pp. 353–354 (Society of Manufacturing Engineers 1996). This allows for a rapid one-time process for metal forming that does not require expensive and time-consuming post-processing of metal products.

However, despite these advantages, the manufacturing capabilities of conventional drop generators remain limited by the relatively small range of possible drop sizes. Greater variability in the drop size is desired to allow more efficient rapid prototyping by allowing the mass flux to be set according to the outline geometry and desired internal micro-structure of the product at a given point. Despite the variability of external oscillation, the possible range of drop sizes from a conventional drop generator is limited by the fixed injector diameter, which is typically less than one millimeter. Consequently, the liquid jet of a conventional drop generator remains laminar.

Therefore, a principle object of the present invention is to provide an apparatus and method for manufacturing a three-dimensional object utilizing a continuously variable diameter liquid jet to create variable drop sizes.

Another object of the present invention is to provide an apparatus and method for manufacturing a three-dimensional object utilizing a controllable laminar planar liquid jet to form a liquid sheet and create arrays of uniform molten metal drops.

A further object of the present invention is to provide an apparatus and method for manufacturing a three-dimensional object utilizing a piezoelectric oscillator and piezoelectric transducer circuit for creating continuously variable diameter and controllable planar jets.

Yet another object of the present invention is to provide an apparatus and method for manufacturing a three-dimensional object utilizing a position controllable platform.

Further objects, features and advantages of the invention will become apparent from the following detailed description taken in conjunction with the accompanying figures showing illustrative embodiments of the invention.

SUMMARY OF THE INVENTION

The present invention is an improved apparatus and method for manufacturing a three-dimensional object whereby a sequence of molten metal drops is by deposited on a substrate to create the three-dimensional object. In accordance with a preferred embodiment of the present invention, the apparatus includes a crucible for holding molten metal, an orifice disposed in the bottom of the crucible through which a jet of molten metal flows towards the substrate, and a mechanically oscillating member immersed in the molten metal for controlling the flow of molten metal through the orifice and for breaking the flow of molten metal into the sequence of molten metal drops.

According to further embodiments of the present invention, the molten metal flowing from the crucible orifice is formed to be a continuously variable diameter jet or a controllable laminar planar jet. The continuously variable diameter jet is useful for producing a wide range of drop sizes. Variability in the drop size allows more efficient rapid prototyping since the mass flux can be set according to the outline geometry and desired internal micro-structure of the product at a given point. The controllable laminar planar jet is useful for large-scale drop forming processes.

The apparatus of the present invention also includes a position controllable platform for positioning a traversable substrate element whereupon the desired three-dimensional object is formed. Advantageously, the position controllable platform is operated and controlled by a computer, position controller device, interface and corresponding software.

In accordance with another aspect of the present invention, a method for manufacturing a three-dimensional object is provided whereby a sequence of molten metal drops is deposited on a substrate to form the three-dimensional object. The method for manufacturing a three-dimensional object includes the steps of depositing molten metal in a crucible; ejecting the molten metal through on orifice disposed in the bottom of a crucible to form a jet of molten metal that flows towards the substrate; and actuating a member immersed in the molten metal to control the flow of molten metal through the orifice and to break up the flow of molten metal into the sequence of molten metal drops. According to further aspects of the invention, the method utilizes a continuously variable diameter jet or a controllable laminar planar jet.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
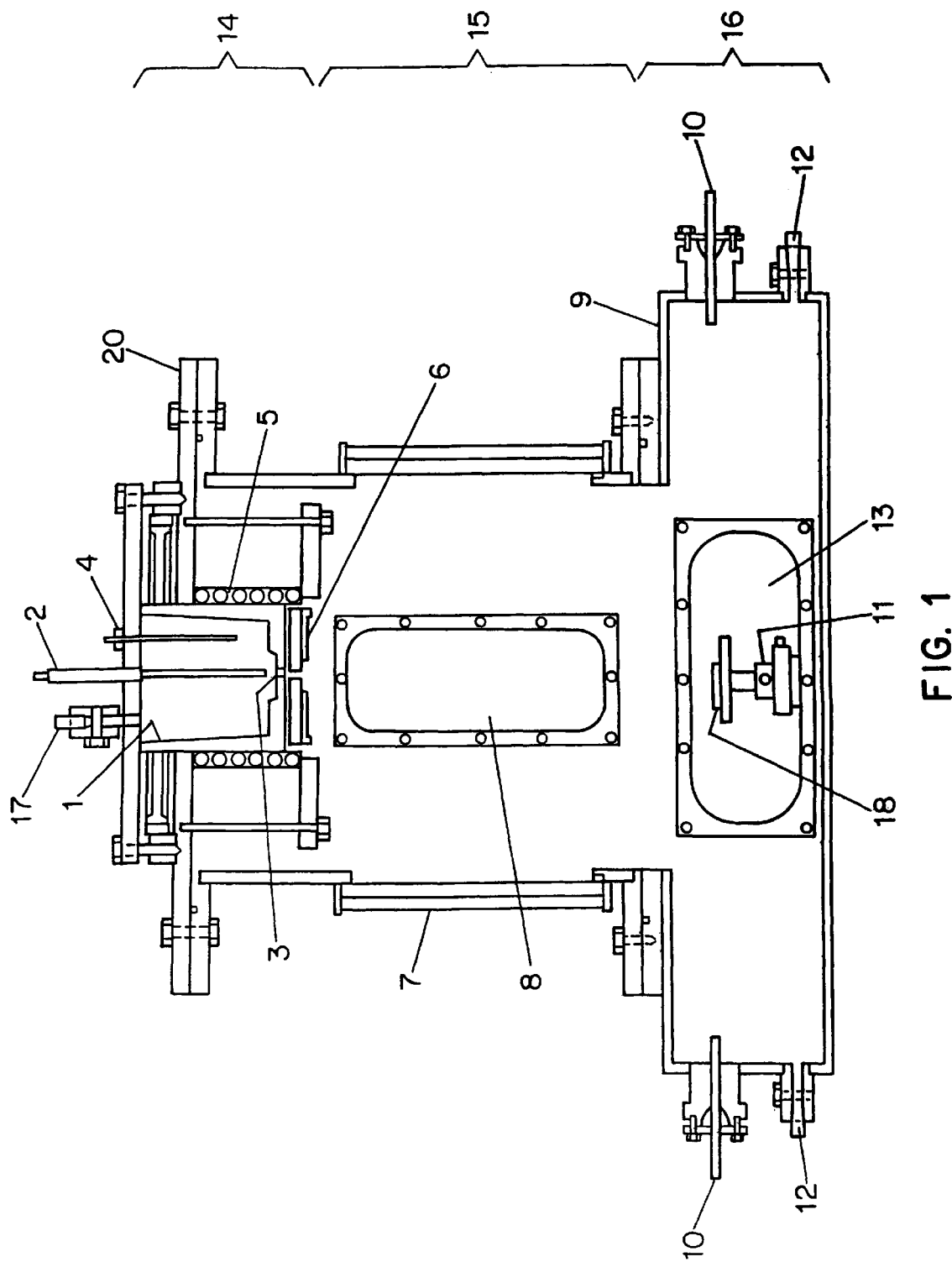
FIG. 1 is a sectional view of a preferred embodiment of an apparatus for manufacturing a three-dimensional object.
Figure 3:
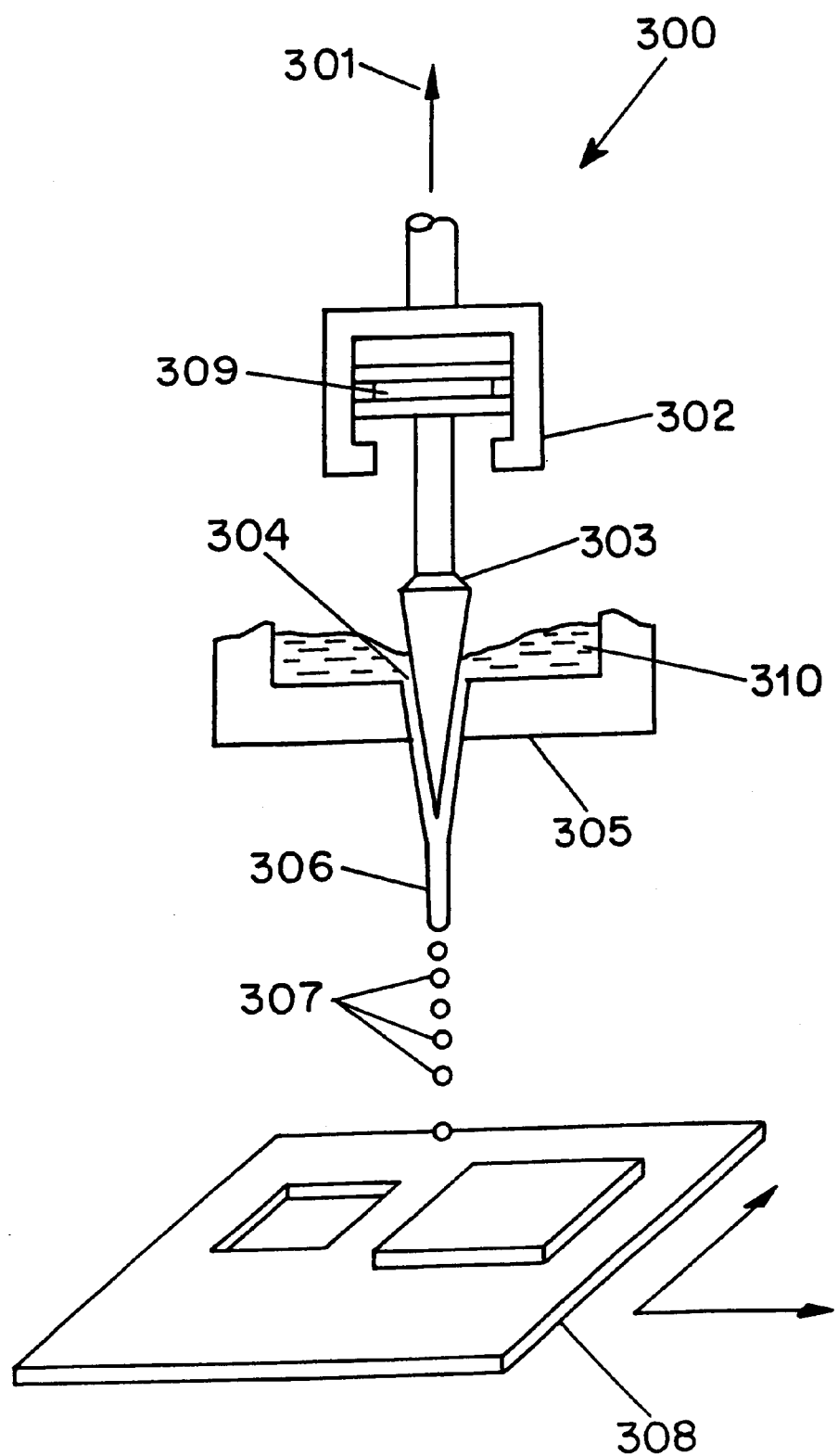
FIG. 3 is a diagrammatic illustration of an apparatus for manufacturing a three dimensional object utilizing a continuously variable diameter jet according to a preferred embodiment of the present invention.
Figure 4:
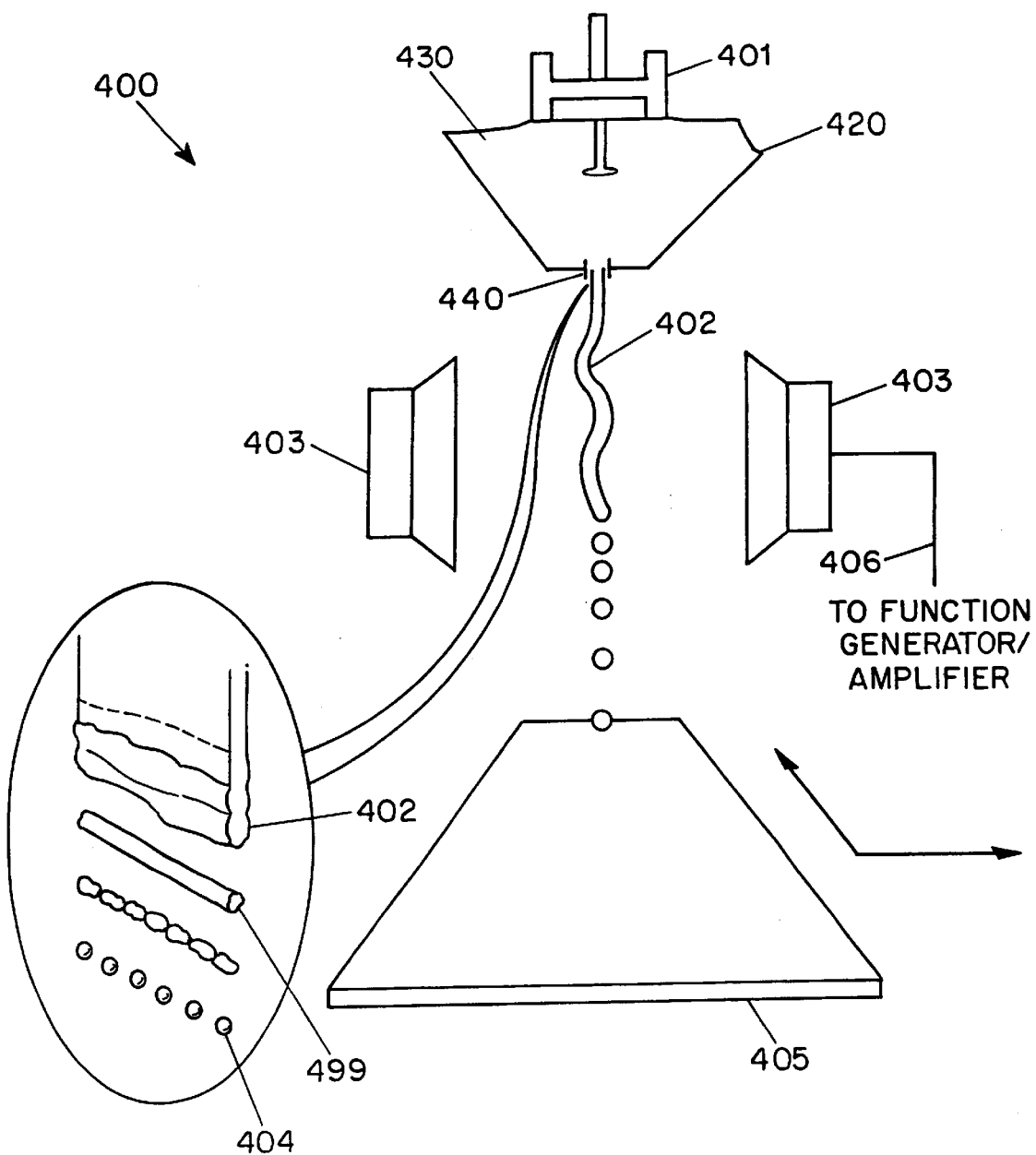
FIG. 4 is a further diagrammatic illustration of an apparatus for manufacturing a three dimensional object utilizing a controllable planar jet according to a preferred embodiment of the present invention.

FIG. 1 illustrates a preferred embodiment of an apparatus for manufacturing a three-dimensional objects. The apparatus includes a uniform molten drop deposition system 20 for use in rapid prototyping and materials processing. The uniform molten drop deposition system 20 can be configured as a continuously variable diameter jet apparatus 300 as shown in FIG. 3, or a controllable planar jet apparatus 400 as shown in FIG. 4.

As further shown in FIG. 1, the uniform molten drop deposition system 20 includes a crucible section 14. The crucible section 14 includes a crucible 1, preferably a heated crucible, for holding molten metal deposited therein, a piezoelectric oscillator 2 for agitating the molten metal deposited in the crucible into a sequence of molten metal drops, and an orifice 3 disposed in the bottom of the crucible 1 through which a jet of the molten metal flows towards a traversable substrate 18. Also included as part of the crucible section 14 is a temperature control ("T/C") sensor 4 for monitoring the temperature of the molten metal, a band heater 5 for heating the crucible 1, and a charge plate 6 for controlling the trajectories and preventing agglomeration of the molten metal drops. The crucible section 14 may also include an external pressure source 17, preferably a conventional pressure source using non-reactive gases such as nitrogen or helium, for facilitating the flow of the molten metal from the crucible 1.

In addition, the uniform molten drop deposition system 20 of FIG. 1 includes a spray chamber section 15 and a deposition chamber section 16. The spray chamber section 15 includes a spray chamber 7 through which the molten metal passes, and spray a chamber window 8 for monitoring the deposition process. The deposition chamber section 16 includes a deposition chamber 9 for housing a position controllable platform 11 that is used for supporting and positioning the traversable substrate 18. The deposition chamber section 16 also includes sensor wires 10, a vacuum/gas line 12 and a deposition chamber window 13 for further monitoring of the deposition process.

As further shown in FIG. 1, the traversable substrate element 18 is used to build the three-dimensional object in a uniform, incremental manner. The resulting metal products are thus fine, equiaxed micro-structures relatively free of defects such as porosity or alloy segregation. This allows for a rapid metal forming that does not require expensive and time-consuming post-processing of the metal products.

The uniform molten drop deposition system 20 can therefore be used to manufacture three-dimensional multi-material structures in layers without the need for special mandrels or tooling. In addition, the uniform molten drop deposition system 20 of the present invention can be used to manufacture three-dimensional parts and tooling directly from computerized virtual models. "Slicing" algorithms can be used in conjunction with the computer models to operate the uniform molten drop deposition system 20 according to the desired shapes of the three-dimensional objects.

Figure 2:
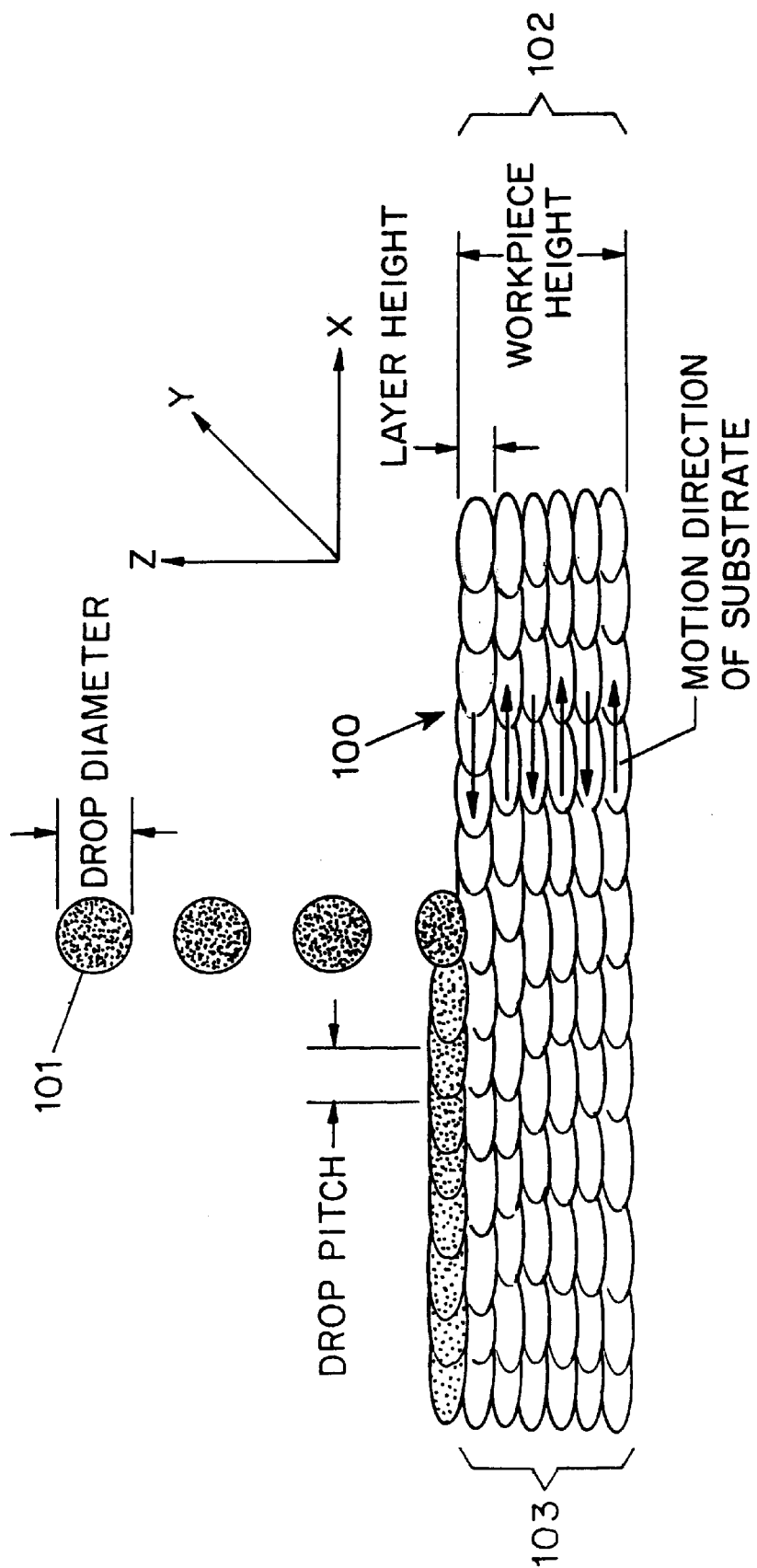
FIG. 2 is a side elevation view of a three dimensional object formed by the apparatus of FIG. 1.

FIG. 2 shows a side elevation view of a three-dimensional object formed by a uniform molten drop deposition system such as the one shown in FIG. 1. As shown in FIG. 2, semi-molten metal drops 101, each characterized by a drop diameter d and drop pitch p, are deposited layer-by-layer on a solidified metal substrate 103 to form a three-dimensional metal object 100. When completed, the three-dimensional metal object 100 is thus comprised of a plurality of metal layers 102, each layer being characterized by a layer height $h_l$. The aggregate of the metal layers 102 forming the solidified metal substrate 103 is further characterized by a workpiece height $h_w$. The three-dimensional metal object 100 can be built layer-by-layer as instructed, for example, by a computer-aided design ("CAD"), process-model integrated computer.

In addition, a low-melting-temperature complementary material (not shown) can be deposited along with the molten metal to form a support structure for the molten metal during formation of more complex metal structures. Layers of this complementary material are deposited in the same manner as the metal layers 101. Because of the lower melting temperature of the complementary material as compared to the melting temperature of the metal, the complementary material can be removed immediately after completion of the formation process thus yielding the desired three-dimensional metal object.

FIG. 3 shows an apparatus 300 for manufacturing a three dimensional object utilizing a continuously variable diameter jet according to a preferred embodiment of the present invention. As shown in FIG. 3, the continuously variable diameter jet apparatus 300 includes a piezoelectric oscillator 302, which includes a piezoelectric transducer 309 for agitating molten metal, a pintle 303 for cooperating with the piezoelectric oscillator 302, a motion control unit 301 for positioning the pintle 303 and for controlling the position of a position controllable platform, a heated crucible 305, and a conical nozzle orifice 304 through which the molten metal flows. The heated crucible 305 is a reservoir for liquid metal 310, which the apparatus 300 uses to produce a continuously variable diameter liquid jet 306 and drops 307 of various sizes. The drops 307 are then deposited layer-by-layer on a traversable substrate element 308. Accordingly, the apparatus of FIG. 3 can be operated to produce a wide variety of drop sizes.

As further shown in FIG. 3, the pintle 303 is responsive to the motion control unit 301 and thus the effective size of the orifice, or injector diameter, is variable. When the pintle 303 is completely withdrawn from the conical nozzle orifice 304, there is no flow constriction and the effective injector diameter is that of the conical nozzle orifice 304 itself. When the pintle 303 is inserted into the conical nozzle orifice 304, the effective flow area is reduced and the flow exiting the conical nozzle orifice 304 follows the contour of the pintle 303 to form the liquid jet 306 having a diameter smaller than that of the conical nozzle orifice 304. Thus, the apparatus 300 is effective for yielding molten metal liquid jets with variable size diameters, and consequently, molten metal drops of different sizes.

It has been shown that proper insertion of the pintle 303 in a downward direction towards the conical nozzle orifice 304 can reduce the diameter of the continuously variable diameter liquid jet 306 by a factor of three. In addition, with further optimization of the pintle 303 and the conical nozzle orifice 304 structures, and with optimization of liquid jet flow rate controls, the diameter of the liquid jet 306 can be reduced by a factor of five. This corresponds to a factor of 25 change in flow area and hence mass flux. Since it is the thermal state of the drop that directly affects the deposited micro-structure, the metal product property is a very sensitive function of the drop size. Thus, the ability to vary the drop diameter from 50 to 250 μm, for example, is a significant enhancement over the current technology.

Advantageously, the variability of the drop size allows (1) formation of the micro-structure of the metal product from the deposited liquid metal to be controlled in a continuous process, and (2) the mass flux of the liquid metal to be directly controlled for optimum deposition of metal depending upon the outline geometry of the product at a given point.

With the continuously variable diameter jet apparatus 300 of the present invention, for example, large-scale features of a metal product can be optimally formed using large metal drops, while fine features can be optimally formed using small drops for accurate representation of the designed geometry. In a preferred embodiment according to FIG. 3, the liquid metal 310 is ejected by applying a weak back pressure to the liquid metal 310 in the heated crucible 305 via an inert gas pressure source such as the external pressure source 17 of FIG. 1. As required, the pintle 303 itself can serve as the oscillator to exert the external force required to break up the liquid jet 306 by directly connecting it to a piezoelectric oscillator 302. Alternatively, a separate oscillating plate (not shown) can be positioned near the conical nozzle orifice 304 to exert the force required to break up the liquid jet 306. The geometry of the pintle 303 and the parameters of the applied oscillation are selected to provide optimum operation.

Accordingly, feature-dependent drop size production is realized by the motion control circuit 301. In a further aspect of the present invention, the motion control circuit 301 provides the controls for producing a pre-programmed sequence of drops 307 with variable drop sizes. The motion control circuit 301 also controls the position of the traversable substrate element 308 such that the drops 307 are deposited in the desired locations. In addition, by applying an electrical field via a device similar to the charge plate 6 in FIG. 1, the drops 307 can be electrically charged to control trajectories and prevent agglomeration.

FIG. 4 shows an apparatus 400 for manufacturing a three-dimensional object utilizing a controllable laminar planar jet according to a preferred embodiment of the present invention. As shown in FIG. 4, the controllable laminar planar jet apparatus 400 includes a piezoelectric oscillator 401, a heated crucible 420, a planar nozzle 440, preferably a rectangular contoured slit nozzle, loudspeakers 403, a function generator/audio amplifier 406 and a piezoelectric transducer circuit 500. The heated crucible 420 is used as a reservoir for liquid metal 430, which passes through the planar nozzle 440 as laminar planar liquid jet 402 and then is broken into horizontally cylindrical ligaments 499 via external pressure oscillation. Each of the horizontally cylindrical ligaments 499 are then agitated into an array of uniform drops 404 by the external pressure oscillation. The array of uniform drops 404 are then deposited onto a traversable substrate element 405.

Figure 5:
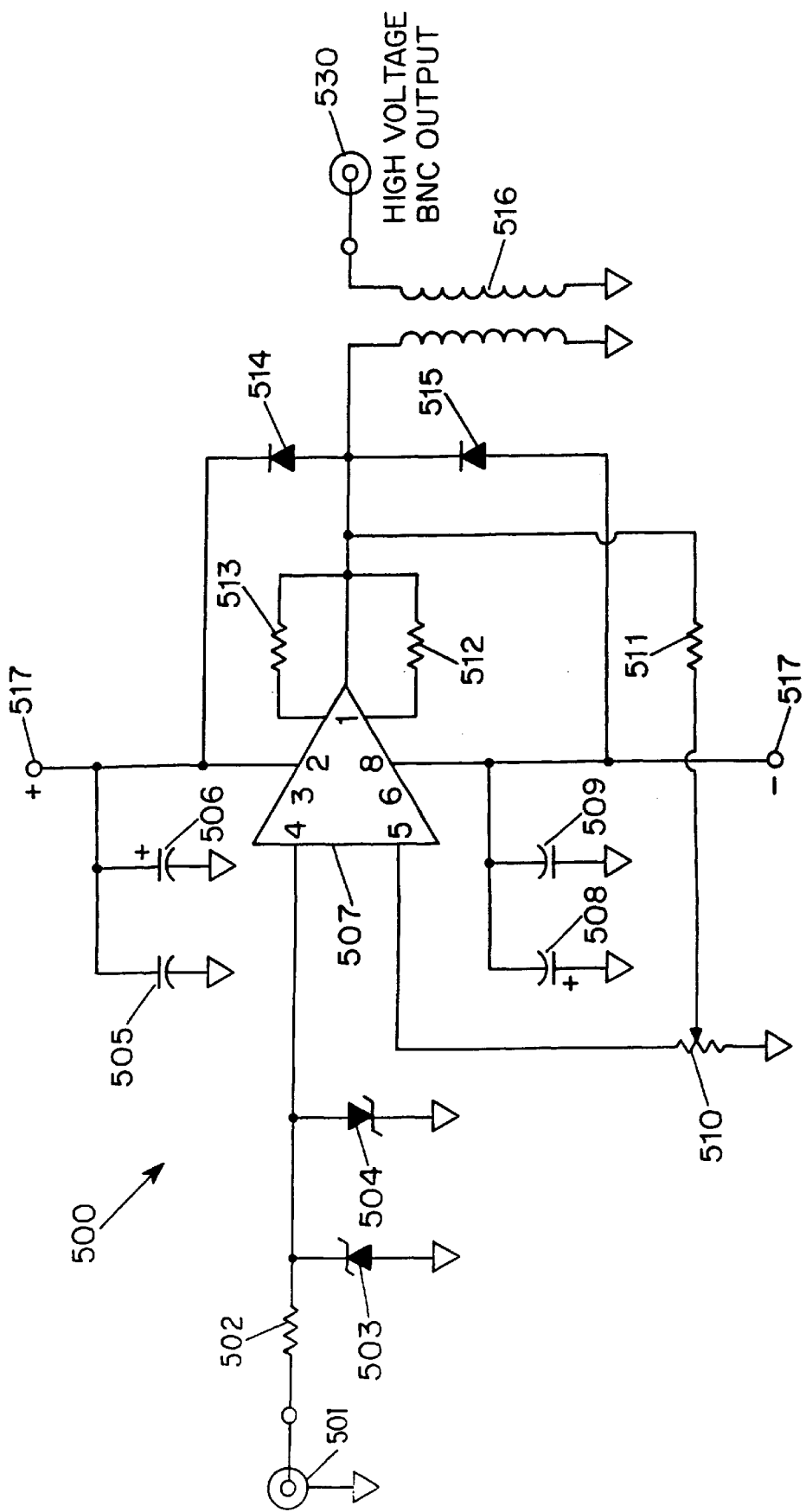
FIG. 5 is a schematic circuit diagram for a piezoelectric transducer circuit according to a preferred embodiment of the present invention.

In forming the desired three-dimensional object, pressure oscillation is provided by the piezoelectric oscillator 401, which is driven by the piezoelectric transducer circuit 500 of FIG. 5, and loud speakers 403, which are driven by the frequency generator/audio amplifier 406. Drop sizes are precisely controlled by selecting the proper piezoelectric oscillation and audio signal parameters.

The break-up of the laminar planar liquid jet 402 is made possible by the formation and amplification of surface disturbance waves. See N. Dombrowski and W. R. Johns, "The Aerodynamic Instability and Disintegration of Viscous Liquid Sheets", *Chemical Engineering Science,* Vol. 18, pp. 203–214 (1963). The resulting aerodynamic interaction between the laminar planar liquid jet 402 and the surface disturbance waves thus results in drop formation from the liquid surface. Via the piezoelectric oscillator 401 and the loudspeakers 403, the desired wavelength and wave orientation are selected as required to generate linear arrays of drops of uniform size.

In a further aspect of the present invention, the loudspeakers 403 include two speakers each with a 50 W output and a frequency response between 0.028 and 20 kHz. To enhance the acoustic excitation of the laminar planar liquid jet 402, an acoustic chamber (not shown) is provided around the laminar planar liquid jet 402. The excitation signal for the loudspeakers 403 is generated by the function generator/audio amplifier 406. The generated signal is nominally a 0.00001 to 1 MHZ signal amplified to 75 W (max) by the audio amplifier of 406.

Thus, the advantages of the controllable planar jet apparatus 400 are: (1) an ability to produce a large number of drops, and hence large mass flux; (2) an ability to spray arrays of metal drops such that metal layers are rapidly formed by one scan or sweep; and (3) applicability to high-speed, large scale manufacturing processes involving liquid metals.

The piezoelectric oscillator of FIGS. 3 and 4 includes a piezoelectric transducer and a piezoelectric transducer circuit 500 as shown in FIG. 5. The frequency of oscillation for the piezoelectric oscillator is chosen according to the size and the volumetric flow rate of the drops to be generated. The drop size varies with the frequency of oscillation, e.g., a smaller size drop can be obtained by increasing the oscillation frequency and vice versa.

FIG. 5 is a circuit schematic for the piezoelectric transducer circuit 500. The piezoelectric transducer circuit includes a function generator (not shown) supplying a since or square wave waveform voltage to input terminal 501, current limiting resistors 502 and 511–513, zener diodes 503 and 504, capacitors 505, 506, 508 and 509 for filtering the input voltage into the amplifier 507, a potentiometer 510, an amplifier 507 for amplifying the signal supplied by the function generator 501, fly-back diodes 514 and 515, a transformer 516 for stepping up the signal amplified by amplifier 507, a power supply 517 and shielded BNC cables (not shown). The piezoelectric transducer circuit 500 is used to drive the piezoelectric transducers of FIGS. 3 and 4, which are in turn used to produce both continuously variable diameter and controllable laminar planar liquid jets used to form the molten metal drops.

In a further preferred embodiment of the piezoelectric transducer circuit 500, the amplifier 507 has a constant output voltage response between the frequencies 0.5 to 25 kHz, i.e., the output voltage does not change with frequency when operated within the frequency range of 0.5 to 25 kHz. The amplifier 507 combined with the transformer 516 is capable of providing an output signal having a maximum peak-to-peak voltage of 800 V, although a peak-to-peak voltage level less than 800 V is required to excite the piezoelectric transducer 521. In a preferred embodiment of the present invention, the amplifier 507 is an Apex PA08A operational amplifier and the transformer 516 is a 1:10 step up transformer.

Also, the piezoelectric transducer circuit 500 of FIG. 5 is designed to protect the amplifier 507 from dangerous overcurrent conditions. Fly-back diodes 514 and 515 placed between the amplifier 507 and the transformer 516 prevent current from flowing into the amplifier 507 when a polarity reversal occurs. The zener diodes 503 and 504 placed at the amplifier 507 input protect the amplifier 507 by clipping over-currents that may be harmful to the amplifier 507. In addition, as shown in FIG. 5, current limiting resistors 502 and 511–513 prevent the amplifier 507 from drawing additional current.

As will be understood, mechanical deformation of the piezoelectric transducer results when the piezoelectric transducer circuit output signal is applied, the degree of mechanical deformation depending on the magnitude of the applied signal. The deformation is used to oscillate the shaft (not shown) at a resonant frequency required to break the laminar planar or variable diameter liquid jets into horizontally cylindrical ligaments 499 (FIG. 4) or continuously variable diameter jets 306 (FIG. 3), and subsequently into uniform drops 307 or 404 (FIGS. 3 and 4, respectively). In a preferred embodiment of the present invention, the material comprising the piezoelectric transducer is lead zirconate titanate manufactured by PiezoKinetics, Inc., of Ellefonte, Pa.

Referring again to FIG. 2, the preferred embodiments of the present invention also include a position controllable platform 11 centered around a motorized stage (not shown) capable of translating in all three Cartesian axes with micro-meter resolution. The motorized stage is controlled by a computer (not shown), a position controller device (not shown), and an appropriate interface (not shown) between the computer and the position controller device (not shown).

In a further preferred embodiment of the present invention, position controllable platform 11 is controlled by a desktop PC via an RS-232 interface. Inputs from the PC to the position controller device are governed by a software package which accepts three dimensional data in CAD-type formats, slices the data into appropriate cross sections and then properly positions traversable substrate element 18 beneath the jets (not shown) to form each cross section. The completed workpiece is formed by building the cross sections from the bottom up in sequential order. The system is highly flexible in that a multitude of software packages can be used to design and store the desired forms. Additionally, designs can be transmitted electronically to the system allowing for remote operation and resource networking.

Although the present invention has been described in connection with particular embodiments thereof, it is to be understood that such embodiments are susceptible of modification and variation without departing from the inventive concept disclosed. All such modifications and variations, therefore, are intended to be included within the spirit and scope of the appended claims.

What is claimed is:

1. A method for manufacturing a three-dimensional object by deposition of a sequence of molten metal drops on a substrate, said method comprising the steps of:

depositing a reservoir of molten metal in a crucible;

ejecting molten metal from said reservoir through a planar nozzle orifice in the bottom of said crucible to form a variable-size laminar planar jet of molten metal flowing from said orifice towards said substrate;

applying mechanical oscillations to the molten metal to cause said planar jet of molten metal to breakup into a sequence of falling horizontal disposed cylindrical ligaments, wherein said ligaments breakup into said sequence of molten metal drops.

2. The method according to claim 1, further comprising the step of applying an external force to facilitate said flow of molten metal from said crucible.

3. The method according to claim 1, further comprising the step of applying an electric charge to said molten metal drops to control the trajectories and prevent agglomeration of said molten metal drops.

4. The method according to claim 1, further comprising the step of automatically varying the position of said substrate to create said three-dimensional object.

5. The method according to claim 1, wherein said mechanical oscillations are applied to the molten metal reservoir in said crucible.

6. The method according to claim 1, further comprising the step of controlling the size of the orifice to vary the size of the molten metal drops.

7. The method according to claim 1, wherein the orifice in said crucible is elongated to form a laminar planar jet of molten metal flowing towards said substrate and said mechanical oscillations are applied to the molten metal in said crucible to form a sequence of falling horizontal cylindrical ligaments, and wherein said method further comprises the step of applying oscillating acoustic energy to said falling ligaments to break up said ligaments into molten metal drops.

\* \* \* \* \*

UNITED STATES PATENT AND TRADEMARK OFFICE
CERTIFICATE OF CORRECTION

PATENT NO.   : 6,309,711 B1  Page 1 of 1
DATED        : October 30, 2001
INVENTOR(S)  : Tseng et al.

It is certified that error appears in the above-identified patent and that said Letters Patent is hereby corrected as shown below:

<u>Title page,</u>
Item [54], Title: "METHOD FOR MANUFACTURING A THREE-DIMENSIONAL OBJECT" should read -- APPARATUS AND METHOD FOR MANUFACTURING A THREE-DIMENSIONAL OBJECT --

<u>Column 1,</u>
Line 10, "XAA-009." should read -- and XAA-009. --
Line 51, "*Scrilpta Materials*" should read -- *Scripta Materialia* --

<u>Column 6,</u>
Line 41, "MHZ" should read -- MHz --
Line 63, "zener" should read -- Zener --

<u>Column 7,</u>
Line 26, "zener" should read -- Zener --

<u>Column 8,</u>
Line 28, "breakup" should read -- break up --
Line 29, "horizontal" should read -- horizontally --
Line 30, "breakup" should read -- break up --

Signed and Sealed this

Second Day of July, 2002

*Attest:*

*Attesting Officer*

JAMES E. ROGAN
*Director of the United States Patent and Trademark Office*